Patented May 27, 1941

2,243,578

UNITED STATES PATENT OFFICE 2,243,578

METHOD OF TREATING DYNAMOELECTRIC MACHINES

Robert T. Reardon, Fort Wayne, Ind., assignor to General Electric Company, a corporation of New York No Drawing. Application February 9, 1940, Serial No. 318,195

4 Claims. (Cl. 148—6)

My invention relates to electrical devices having a laminated construction of magnetic material and more particularly to an improved method of eliminating the possibility of short circuits between the laminations thereof.

An object of my invention is to provide an improved method of manufacturing electrical devices of the above mentioned type and particularly to an improved method of manufacturing dynamoelectric machines.

With dynamoelectric machines having rotors of the cast squirrel cage type difficulties have been encountered in that upon machining the peripheral surface thereof, microscopic particles of iron and the metal which is cast into slots, being usually aluminum, are smeared across and in between the laminations, thus short circuiting them. This greatly increases the losses of the machine and consequently lowers its efficiency. To overcome these and other difficulties I provide an improved method which includes subjecting the short circuited portion of the dynamoelectric machine part or other electrical device of the above mentioned type to an acid phosphate treatment.

Further objects and advantages of my invention will become apparent from the following description and the features of novelty which characterize my invention will be pointed out in the claims annexed to and forming a part of this specification.

Dynamoelectric machines having rotors of the squirrel cage type have been manufactured for some time by casting conductors into the slots of the laminations thereof. After casting such a dynamoelectric machine part it is desirable to machine the surface thereof so as to provide a smooth surface and so as to control the air gap which will result when the rotor is placed in the stator. It has been found that after the surface of the rotor has been machined, no matter how carefully, that the load losses are greatly increased and its efficiency thereby greatly reduced. It has been determined that the cause of the decrease in efficiency has been the short circuiting of the laminations. This short circuiting is due to particles of metal which are smeared over the peripheral surfaces of the laminations and in between the laminations during the machine operation. I have found that these undesirable results, due to the smearing of the metallic particles during machining or grinding, can be eliminated by subjecting the short circuited laminated portion to an acid phosphate treatment. This acid phosphate treatment can be carried out in any well known manner, such as described in U. S. Letters Patent 870,939 to Coslett, or in U. S. Letters Patent 1,341,100 to Allen, or in any other suitable manner. The Coslett patent provides for the treating of iron or steel surfaces by subjecting the same to an action of a dilute solution of ordinary phosphoric acid, while the Allen patent provides that the article to be treated is immersed in a solution of dilute phosphoric acid with iron scales dissolved therein, the iron oxide serving as a source of iron and hastening the chemical action.

I have found that when the machine surface of an electrical device such a dynamoelectric machine rotor which has been cast with an electric conductive material, such as aluminum, copper, or magnesium in the slots thereof, is treated by the process described above that its electrical efficiency is thereby unexpectedly and substantially increased. A laminated dynamoelectric machine part showing a loss after grinding of three times its loss before grinding was treated with my improved method. I found the losses in the part so treated to be lowered to a value approximating its original value before grinding.

It is, of course, well known that when a piece of iron is immersed in an aqueous solution of an acid phosphate salt that an iron phosphate coating will be deposited thereon. This, however, is not the only effect on the short circuited laminated part when such is subjected to my improved acid phosphate salt treatment. However, I am not entirely certain as to exactly what does take place. It is felt, however, that the phosphate salt, which may, for example, be manganese dihydrogen phosphate, when dissolved in water combines with the iron to liberate hydrogen. This hydrogen may, by chemical or mechanical phenomenon, dislodge or in some way get underneath the smears of metallic powder which had been pulled on to and between the iron laminations during the grinding operation. Although I do not know exactly what takes place as I have said, I do know, however, that the electrical efficiency of the machined part so treated is greatly increased.

I have described my improved method as applied to a rotor of a dynamoelectric machine, but as I have said my improved method of removing the shorting smears from between the laminations or from the peripheral surfaces thereof may be applied to a dynamoelectric machine stator or to any electrical device which has a laminated portion, the laminations of which may be susceptible of becoming short circuited.

Modifications of the particular methods which I have disclosed embodying my invention will occur to those skilled in the art, so that I do not desire my invention to be limited to the particular arrangements set forth and I intend in the appended claims to cover all modifications which do not depart from the spirit and scope of my invention.

What I claim as new and desire to secure by Letters Patent of the United States is:

1. The method of treating the assembled metallic laminations of an electrical device which has fine metallic particles short circuiting the laminations which includes subjecting the assembled short circuited laminations to an acid phosphate treatment.

2. The method of treating the assembled metallic laminations of a dynamoelectric machine which has fine metallic particles short circuiting the laminations which includes subjecting the assembled short circuited laminations to an acid phosphate treatment.

3. The method of treating a machined cast squirrel cage rotor which includes subjecting the machined surface to an acid phosphate treatment.

4. The method of treating a dynamoelectric machine part having a plurality of stacked laminations with slots and metallic conductors cast in the slots which includes machining the peripheral surface thereof and subjecting the machined part to an acid phosphate treatment.

ROBERT T. REARDON.